United States Patent
Yamane

(10) Patent No.: US 9,327,375 B2
(45) Date of Patent: May 3, 2016

(54) MACHINE TOOL

(71) Applicant: DMG MORI SEIKI CO., LTD., Nara (JP)

(72) Inventor: Masahiro Yamane, Nara (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 553 days.

(21) Appl. No.: 13/712,958

(22) Filed: Dec. 12, 2012

(65) Prior Publication Data

US 2013/0168118 A1 Jul. 4, 2013

(30) Foreign Application Priority Data

Dec. 19, 2011 (JP) .................................. 2011-276899

(51) Int. Cl.
*B25F 3/00* (2006.01)
*B23Q 5/04* (2006.01)
*B23Q 5/00* (2006.01)

(52) U.S. Cl.
CPC *B23Q 5/04* (2013.01); *B23Q 5/048* (2013.01); *B23Q 2005/005* (2013.01)

(58) Field of Classification Search
CPC .............. B23Q 5/04; B23C 1/08; B23C 1/12; B23B 29/24; B23B 21/00; B23B 3/16
USPC .................................................. 173/29, 213
See application file for complete search history.

(56) References Cited

U.S. PATENT DOCUMENTS

| 2,303,565 | A | * | 12/1942 | Luna | ...................... | B23B 45/02 173/214 |
| 3,783,955 | A | * | 1/1974 | Gill | .......................... | B25F 3/00 144/48.5 |
| 4,512,693 | A | * | 4/1985 | Swanson | ................. | B23B 51/00 279/14 |
| 4,810,916 | A | * | 3/1989 | McBride | ............... | B23B 45/001 310/50 |
| 4,885,836 | A | * | 12/1989 | Bonomi | .................... | B21J 15/10 227/51 |
| 4,955,119 | A | * | 9/1990 | Bonomi | .................... | B21J 15/10 227/58 |
| 5,149,230 | A | * | 9/1992 | Nett | ....................... | B25B 21/00 408/125 |
| 5,150,598 | A | * | 9/1992 | Uchida | .................. | B21D 31/06 100/259 |
| 5,261,135 | A | * | 11/1993 | Mitchell | ................. | B25B 21/00 173/50 |
| 5,276,929 | A | * | 1/1994 | Mitchell | ................. | B25B 21/00 173/50 |

(Continued)

FOREIGN PATENT DOCUMENTS

JP 2002-346870 A 12/2002
JP 2010-030029 A 2/2012

*Primary Examiner* — Robert Long

(57) ABSTRACT

To provide a machine tool capable of coping with both a workpiece requiring a small driving force, for example, having good machinability and a workpiece requiring a large driving force, for example, having poor machinability. The machine tool includes a coupling mechanism 9 which couples a first tool post (first tool driving mechanism) 5 and a second tool post (second tool driving mechanism) 6 so that a driving force of the second tool post 6 is added to a driving force of the first tool post 5.

3 Claims, 4 Drawing Sheets

(56) References Cited

U.S. PATENT DOCUMENTS

| | | | | |
|---|---|---|---|---|
| 5,325,581 A * | 7/1994 | Sun | B23Q 39/042 269/266 |
| 6,014,802 A * | 1/2000 | Guerin | B21J 15/10 29/407.01 |
| 6,128,812 A * | 10/2000 | Link | B23B 29/242 29/27 C |
| 6,141,848 A * | 11/2000 | Yousko | B21J 15/10 227/111 |
| 6,269,527 B1 * | 8/2001 | Nelson | B23P 19/04 29/33 R |
| 6,311,591 B1 * | 11/2001 | Grossmann | B23Q 1/5406 29/27 C |
| 7,066,692 B2 * | 6/2006 | Kuhn | B25F 3/00 173/216 |
| 7,371,033 B2 * | 5/2008 | Whitehead | B25F 3/00 173/214 |
| 7,682,112 B2 * | 3/2010 | Panczuk | B23Q 1/01 409/132 |
| 8,297,158 B2 * | 10/2012 | Watanabe et al. | 82/121 |
| 8,640,787 B2 * | 2/2014 | Rohrer | 173/114 |
| 8,875,604 B2 * | 11/2014 | Tsuyusaki | B23B 3/30 82/117 |
| 8,887,360 B2 * | 11/2014 | Fukuoka | B23B 3/162 29/27 C |
| 2002/0033084 A1 * | 3/2002 | Nakaminami et al. | 82/120 |
| 2006/0218764 A1 * | 10/2006 | Hashimoto et al. | 29/27 C |
| 2007/0059116 A1 * | 3/2007 | Brunemann | 409/201 |
| 2007/0084319 A1 * | 4/2007 | Ueda et al. | 82/129 |
| 2007/0107547 A1 * | 5/2007 | Oiwa | B23B 5/02 74/815 |
| 2009/0217792 A1 * | 9/2009 | Oiwa | 82/1.11 |
| 2009/0308214 A1 * | 12/2009 | Watanabe | B23B 3/165 29/27 R |
| 2012/0107064 A1 * | 5/2012 | Chen | B23Q 39/23 409/203 |
| 2012/0132450 A1 * | 5/2012 | Timm | A61B 19/2203 173/47 |
| 2012/0234570 A1 * | 9/2012 | Machida | B25F 5/02 173/197 |
| 2013/0213683 A1 * | 8/2013 | Brewster | B23Q 11/0046 173/198 |
| 2015/0128530 A1 * | 5/2015 | Brunson | B65B 9/135 53/441 |

* cited by examiner

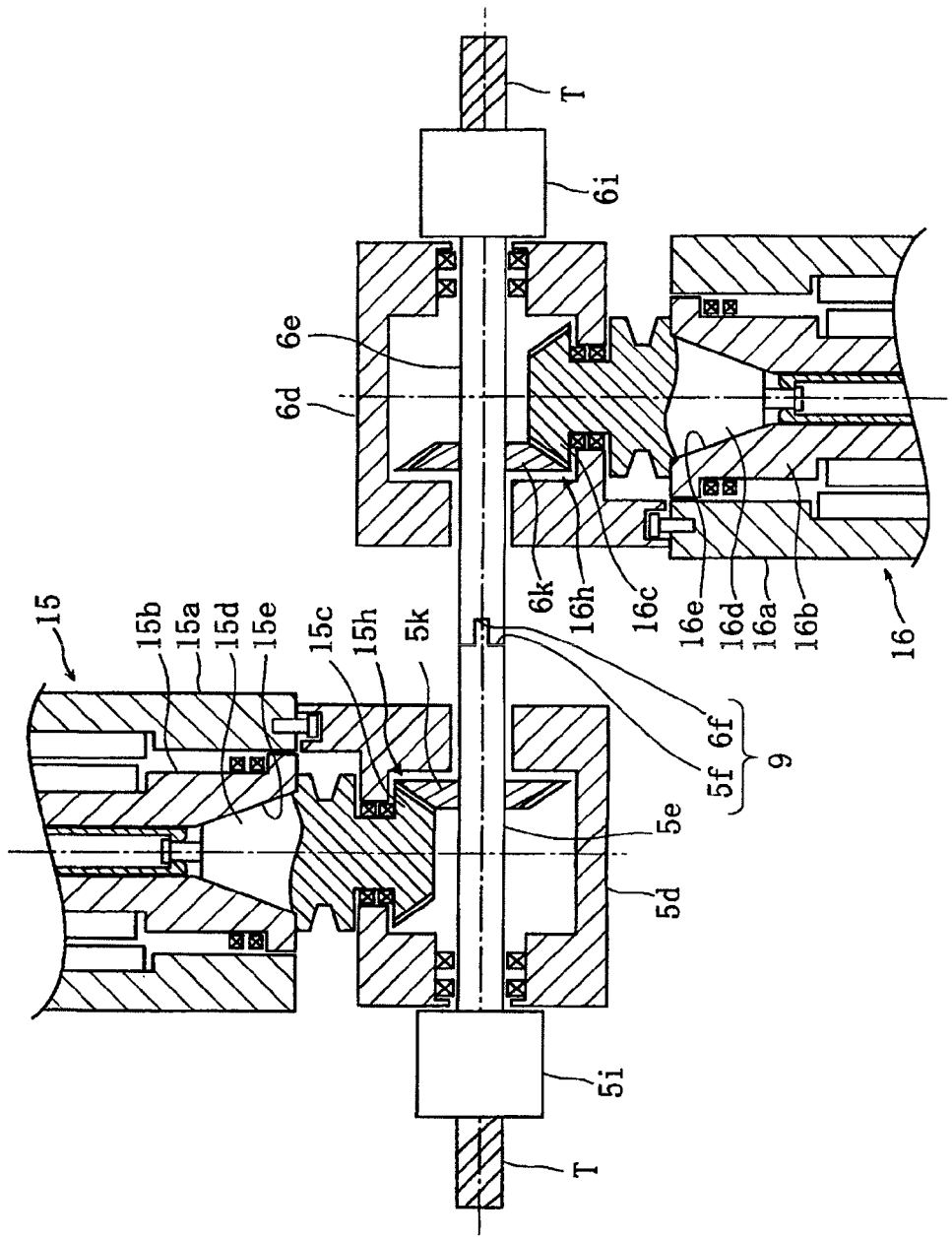

MACHINE TOOL

BACKGROUND OF THE INVENTION

1. Field of the Invention

The present invention relates to a machine tool including a workpiece holding mechanism and a plurality of tool driving mechanisms.

2. Description of the Related Art

As a machine tool which includes a set of two headstocks (workpiece holding mechanisms) and a set of two tool posts (tool driving mechanisms) and machines workpieces held on the headstocks by tools loaded on the tool posts, there has been conventionally one disclosed in, for example, Japanese Patent Application Laid-open No. 2010-30029.

SUMMARY OF THE INVENTION

In the aforesaid machine tool, the tool posts are each structured so as to be capable of generating a driving force necessary for machining a workpiece. In this case, if the machine normally machines a workpiece having good machinability, a motor or the like capable of generating the driving force necessary for the machining of this workpiece having good machinability is adopted as a matter of course. Therefore, if a workpiece poor in machinability is tried to be machined by the same machine, the driving force is insufficient, which lowers machining speed. If the machine is given a driving force high enough to machine such a workpiece poor in machinability, the driving force becomes too high at the time of the normal machining.

A possible solution to such a problem is a machine tool in which a plurality of motors are provided and the number of the motors used is varied according to the required driving force.

However, in the aforesaid machine tool, at the time of the normal machining, the generated driving force itself does not become too high because the number of the driving motors is reduced, but the driving force of the other driving motor is not used at the time of the normal machining even though the driving force more than necessary is potentially available, which involves a problem that the machine tool is poor in cost effectiveness.

The present invention was made in consideration of the conventional circumstances described above, and has an object to provide a machine tool capable of coping with both a workpiece requiring a small driving force, for example, having good machinability and a workpiece requiring a large driving force, for example, having poor machinability.

The present invention is a machine tool provided with a first workpiece holding mechanism which holds a workpiece; a first tool driving mechanism which is movable relatively to the first workpiece holding mechanism and rotationally drives a tool; and a second tool driving mechanism which is movable relatively to both the first workpiece holding mechanism and the first tool driving mechanism and rotationally drives a tool, the machine tool including a coupling mechanism which couples the first tool driving mechanism and the second tool driving mechanism so that a driving force of the second tool driving mechanism is added to a driving force of the first tool driving mechanism.

According to the present invention, when a driving force necessary for machining each workpiece is smaller than a possessed driving force that each of the tool driving mechanisms has, each workpiece is machined independently by each of the tool driving mechanisms. When the necessary driving force is larger than the possessed driving forces the coupling mechanism couples the second tool driving mechanism to the first tool driving mechanism and a workpiece requiring the large driving force is machined by the first tool driving mechanism.

As described above, in the present invention, according to the required driving force, a workpiece can be machined independently by each of the tool driving mechanisms or can be machined while the tool driving mechanisms are coupled. This makes it possible to cope with the machining of a workpiece requiring a large driving force even though the possessed driving force of each of the tool driving mechanisms is set small.

BRIEF DESCRIPTION OF THE DRAWINGS

FIG. 4 is a plane sectional view showing a coupling mechanism of the machine tool.

DETAILED DESCRIPTION OF THE PREFERRED EMBODIMENTS

Figure 1:
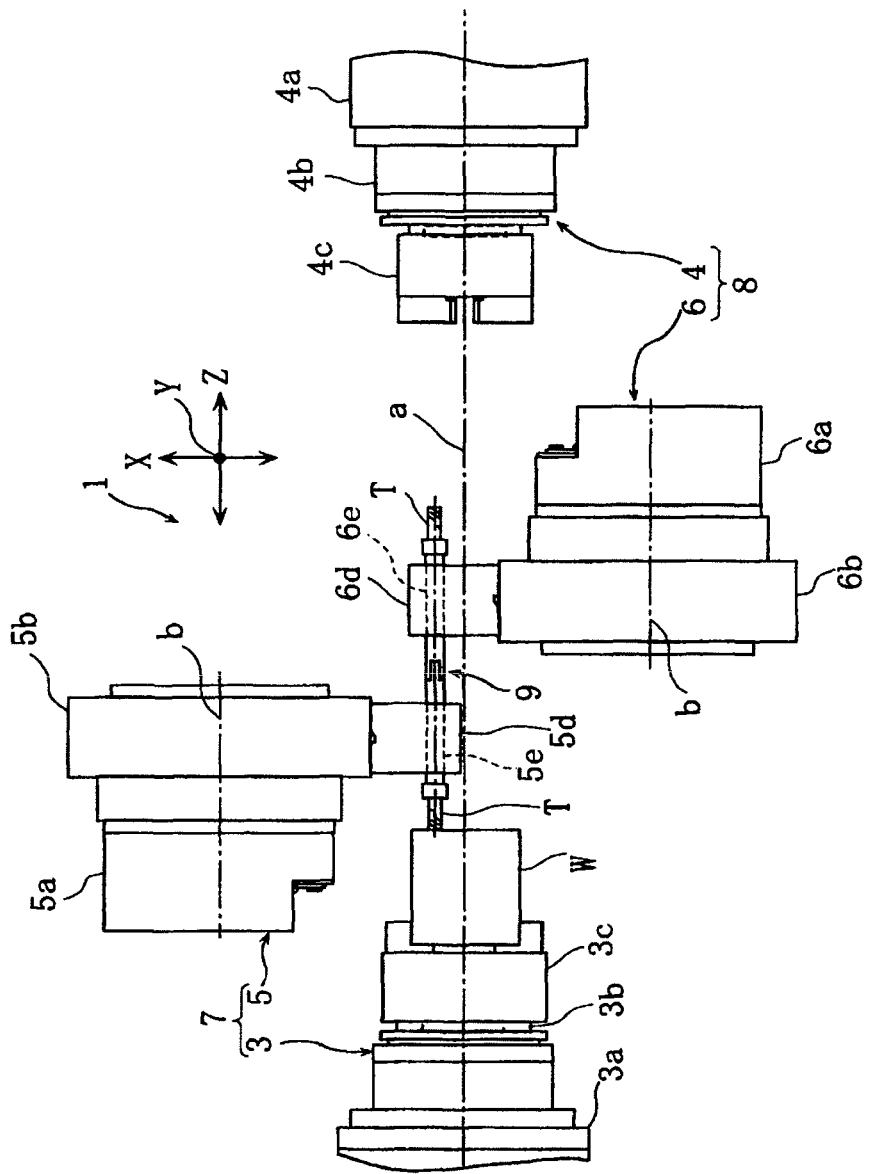
FIG. 1 is a plane view of a machine tool according to an embodiment 1 of the present invention.
Figure 2:
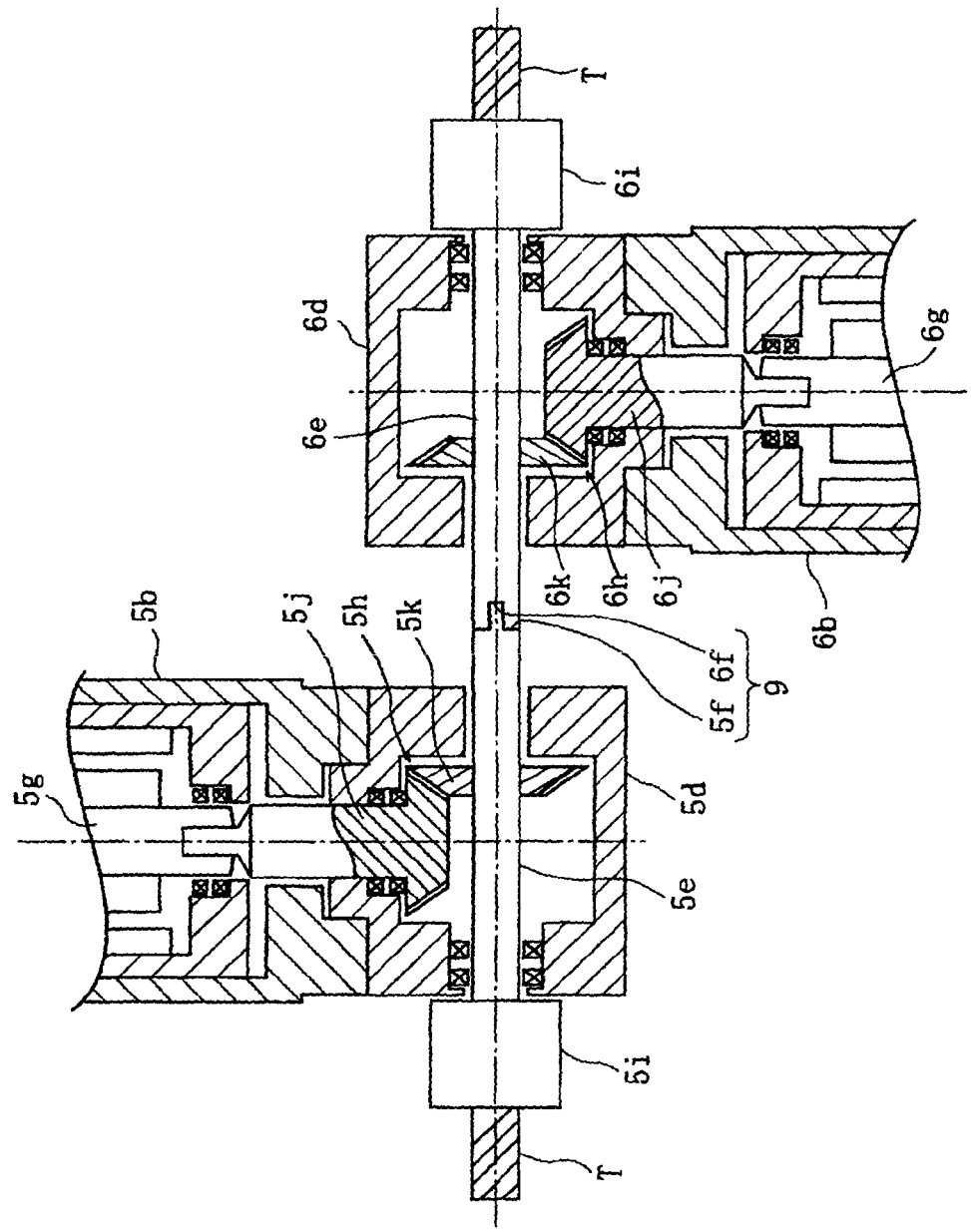
FIG. 2 is a plane sectional view showing a coupling mechanism of the machine tool.

Hereinafter, embodiments of the present invention will be described based on the attached drawings. FIG. 1 and FIG. 2 are explanatory views of a machine tool according to an embodiment 1 of the present invention.

In the drawings, reference sign 1 denotes a turret lathe (machine tool). This turret lathe 1 has: a slant-type bed (not shown); a first headstock (first workpiece holding mechanism) 3 which is disposed on a left portion of the bed to hold a workpiece; a second headstock 4 which is disposed on a right portion of the bed to hold a workpiece; a first tool post (first tool driving mechanism) 5 disposed at a far-side high position when seen from a front of the machine; and a second tool post (second tool driving mechanism) 6 disposed on a near-side low position.

A first machining unit 7 is composed of the first headstock 3 and the first tool post 5, and a second machining unit 8 is composed of the second headstock 4 and the second tool post 6.

The first headstock 3 has: a headstock main body 3a fixedly disposed on the bed; a spindle 3b rotatably supported on the headstock main body 3a and rotationally driven by a spindle motor, not shown; and a chuck 3c mounted at a tip portion of the spindle 3b. A workpiece W is held by the chuck 3c. Similarly, the second headstock 4 has a headstock main body 4a, a spindle 4b, and a chuck 4c, and is disposed so as to be movable in a Z-axis direction. The first spindle 3b and the second spindle 4b are disposed coaxially so that their axial centers "a" extend in a horizontal direction and make the same straight line. Incidentally, at the time of the machining in this embodiment, a workpiece is not held by the chuck 4c of the second head stock 4.

The first tool post 5 has: a tool post main body 5a which is disposed on the bed so as to be movable in the Z-axis direction, and an X-axis direction and a Y-axis direction which are perpendicular to the Z-axis direction and extend in a front and rear direction and in a vertical direction respectively; a turret 5b supported by the tool post main body 5a so as to be rotatable around an indexing axis b; a plurality of tool holding cases 5d disposed on an outer peripheral portion of the turret 5*b* at predetermined angular intervals; and tool shafts 5*e* rotatably supported by the tool holding cases 5*d*.

An indexing mechanism, not shown, which indexes the turret 5*b* at a predetermined angular position is housed in the tool post main body 5*a*. Further, a driving unit which rotationally drives the tool shafts 5*e* is housed in the turret 5*b*. This driving unit has: a driving motor (not shown) disposed at a center portion of the turret 5*b*; a drive shaft 5*g* rotationally driven by the driving motor; and a bevel gear mechanism 5*h* which transmits the rotation of the drive shaft 5*g* to the tool shafts 5*e*. This bevel gear mechanism 5*h* has an input gear 5*j* driven by the drive shaft 5*g* and an output gear 5*k* engaged with the input gear 5*j* and fixed to the tool shafts 5*e*.

The second tool post 6, which has the same structure as that of the first tool post 5, has a tool post main body 6*a*, a turret 6*b*, tool holding cases 6*d*, tool shafts 6*e*, a drive shaft 6*g*, and a bevel gear mechanism 6*h* composed of an input gear 6*j* and an output gear 6*k*, and further has an indexing mechanism similar to the aforesaid one.

Thus, the first tool post 5 is movable relatively to the second tool post 6 and the first and second headstocks 3, 4, and at the same time, the second tool post 6 is movable relatively to the first tool post 5 and the first and second headstocks 3, 4.

The tool shaft 5*e* of the first tool post 5 projects from the tool holding case 5*d* toward the first headstock 3 and toward the second headstock 4, and a tool T is attached via a tool joint 5*i* to a projecting portion of the tool shaft 5*e* on the first headstock 3 side. Similarly, the tool shaft 6*e* of the second tool post 6 projects from the tool holding case 6*d* toward the first headstock 3 and toward the second headstock 4, and a tool T is attached via a tool joint 6*i* to a projecting portion of the tool shaft 6*e* on the second headstock 4 side.

On the other hand, an engagement rugged portion 5*f* is formed on the projecting portion of the tool shaft 5*e* on the second headstock 4 side. Similarly, an engagement rugged portion 6*f* is formed on the projecting portion of the tool shaft 6*e* on the first headstock 3 side. When the first and second tool posts 5, 6 are appropriately moved in the X-axis, Y-axis, and Z-axis directions, the both engagement rugged portions 5*f*, 6*f* are engageable/disengageable with/from each other. This structure is a coupling mechanism 9 which couples the first tool post 5 and the second tool post 6 so that the driving force of the tool shaft of one of them is transmitted to the tool shaft of the other.

In the turret lathe 1 according to this embodiment, when the driving force necessary for machining a workpiece W is smaller than the possessed driving forces that the first and second tool posts 5, 6 respectively have, the first and second machining units 7, 8 hold workpieces W, W by the first and second headstocks 3, 4 respectively, and machine the workpieces W, W as required independently by the first and second tool posts 5, 6.

On the other hand, when the driving force for machining a workpiece W is larger than the possessed driving forces that the first and second tool posts 5, 6 respectively have, the first headstock 3 of the first machining unit 7, for example, holds the workpiece W, the tool shaft 5*e* of the first tool post 5 and the tool shaft 6*e* of the second tool post 6 are coupled by the coupling mechanism 9, and the workpiece W is machined while the driving force of the second tool post 6 is added to the driving force of the first tool post 5.

As described above, in the above embodiment, the workpiece can be machined while the tool shafts 5*e*, 6*e* are independently used or are coupled, according to the driving force necessary for machining the workpiece, which makes it possible to cope with the machining of a workpiece W requiring a large driving force even though the possessed driving force of each of the machining units 7, 8 is set small.

Further, when the required driving force is smaller than the possessed driving forces, separate workpieces W, W can be independently machined by the machining units 7, 8 respectively, which enables the efficient use of both the first and second machining units 7, 8.

In the above-described embodiment, the coupling mechanism engages/disengages the engagement rugged portions with/from each other, but the structure of the coupling mechanism of the present invention is not of course limited to that in the above-described embodiment, and the point is that it is only necessary that the driving force of one of the tool shafts is transmitted to the other tool shaft, and for example, the coupling of the tool shafts may be enabled by an electromagnetic clutch mechanism.

Further, in the above-described embodiment, the case where a set of the two tool posts is provided is described, but the present invention is also applicable to a case where a set of three tool posts or more is provided. For example, when in addition to the first and second tool posts, a third tool post is disposed in series with the first tool post, the first tool post and the third tool post can be coupled, and further, the second tool post and the first or third tool post can be coupled.

Furthermore, in the above-described embodiment, the case of the turret lathe is described, but an applicable range of the present invention is not of course limited to the turret lathe, and in short, the present invention is applicable to any case, provided that a plurality of the tool driving mechanisms are provided.

Figure 3:
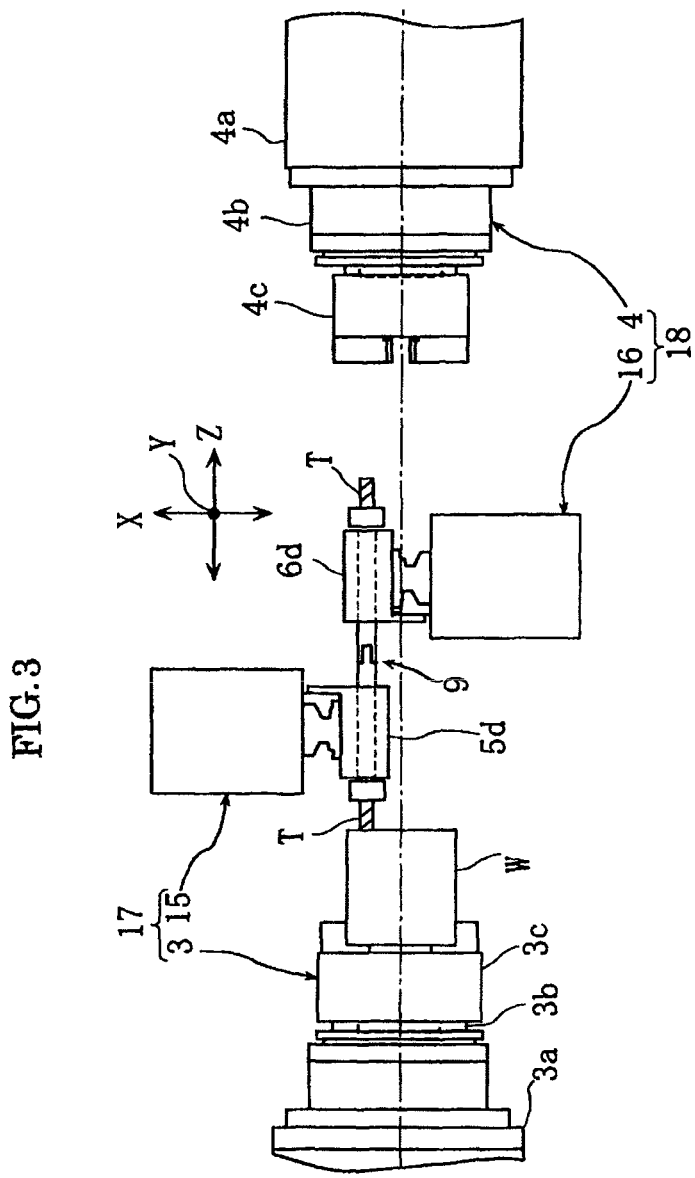
FIG. 3 is a plane view of a machine tool according to an embodiment 2 of the present invention.

FIG. 3 and FIG. 4 are explanatory views of an embodiment 2, and the same reference signs as those in FIG. 1 and FIG. 2 denote the same or corresponding portions.

In the drawings, 15, 16 denote a first tool spindle and a second tool spindle as tool driving mechanisms. The first tool spindle 15 is structured such that its spindle head 15*a* is supported by a column, which is provided upright on a bed to be movable in an X-axis and a Z-axis direction, so as to be movable in a Y axis direction, its spindle 15*b* is rotatably supported by the spindle head 15*a*, and its tool holding case 5*d* is attachably/detachably supported by the spindle 15*b*. A male tapered portion 15*d* formed integrally on an input gear 15*c* of a bevel gear mechanism 15*h* is attachably/detachably fitted with a female tapered portion 15*e* formed at a tip of the spindle 15*b*.

The second tool spindle 16 has a spindle head 16*a* and a spindle 16*b* similar to those of the first tool spindle 15, and when a male tapered portion 16*d* of an input gear 16*c* of a bevel gear mechanism 16*h* is attachably/detachably fitted with a female tapered portion 15*e* of the spindle 16*b*, a tool holding case 6*d* is attachable/detachable to/from the spindle 16*b*.

As in the embodiment 1, there is formed a coupling mechanism 9 which is composed of engagement rugged portions 5*f*, 6*f* and couples the first tool spindle 15 and the second tool spindle 16 so that a driving force of a tool shaft of one of them is transmitted to a tool shaft of the other.

In this embodiment 2 as well, as in the above-described embodiment 1, it is possible to cope with the machining of a workpiece W requiring a large driving force even though a possessed driving force of each of machining units 17, 18 is set small. Further, when required driving forces are smaller than the possessed driving forces, workpieces W, W can be independently machined by the respective machining units 17, 18, which enables the efficient use of the both machining units 17, 18.

Furthermore, the present invention is also applicable to a machine tool including the tool post in the embodiment 1 and the tool spindle in the embodiment 2, and the same operations and effects as those of the embodiments can be obtained.

In the embodiment 1 and the embodiment 2, the case where a set of the two headstocks as the workpiece holding mechanisms is provided is described, but in the present invention, the number of the workpiece holding mechanisms may be one, and in this case as well, it is possible to cope with the machining of a workpiece W requiring a large driving force even though the possessed driving force of each of the tool driving mechanisms is set small.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool comprising:
a bed;
a first workpiece holding mechanism capable of holding a first workpiece and disposed on one side of the bed;
a second workpiece holding mechanism capable of holding a second workpiece and disposed on another side of the bed, the second workpiece holding mechanism opposing to the first workpiece holding mechanism;
a first tool driving mechanism including a first driving source and a first tool shaft, the first tool shaft horizontally disposed between the first workpiece holding mechanism and the second workpiece holding mechanism, the first driving source rotationally driving the first tool shaft to drive a first tool so as to machine the first workpiece;
a second tool driving mechanism including a second driving source and a second tool shaft, the second tool shaft horizontally disposed between the first workpiece holding mechanism and second workpiece holding mechanism, the second driving source rotationally driving the second tool shaft to drive a second tool so as to machine the second workpiece; and
a coupling mechanism provided in the first tool shaft and the second tool shaft which are coaxial, and capable of coupling the first tool driving mechanism and the second tool driving mechanism,
wherein the first tool driving mechanism and the second tool driving mechanism are movable in an axial direction of the first workpiece holding mechanism and the second workpiece holding mechanism, the first tool driving mechanism and the second tool driving mechanism are coupled by relatively moving in the axial direction,
wherein the first tool shaft of the coupling mechanism includes a first projecting portion projecting from the first tool driving mechanism toward the second tool driving mechanism, and the second tool shaft of the coupling mechanism includes a second projecting portion projecting from the second tool driving mechanism toward the first tool driving mechanism,
the first projecting portion includes one of an engagement projected portion and an engagement recessed portion and the second projecting portion includes another one of the engagement projected portion and the engagement recessed portion, and the engagement projected portion and the engagement recessed portion are engageable with and are disengageable from each other, and
wherein a rotational driving force produced from the second driving source of the second tool driving mechanism is added to a rotational driving force produced from the first driving source of the first tool driving mechanism when the first tool driving mechanism and the second tool driving mechanism are coupled by the coupling mechanism.

2. A machine tool comprising:
a bed;
a first workpiece holding mechanism capable of holding a first workpiece and disposed on one side of the bed;
a second workpiece holding mechanism capable of holding a second workpiece and disposed on another side of the bed, the second workpiece holding mechanism opposing to the first workpiece holding mechanism;
a first tool driving mechanism including a first driving source and a first tool shaft, the first tool shaft horizontally disposed between the first workpiece holding mechanism and the second workpiece holding mechanism, the first driving source rotationally driving the first tool shaft to drive a first tool so as to machine the first workpiece;
a second tool driving mechanism including a second driving source and a second tool shaft, the second tool shaft horizontally disposed between the first workpiece holding mechanism and the second workpiece holding mechanism, the second driving source rotationally driving the second tool shaft to drive a second tool so as to machine the second workpiece; and
a coupling mechanism provided in the first tool shaft and the second tool shaft which are coaxial, and capable of coupling the first tool driving mechanism and the second tool driving mechanism,
wherein the first tool driving mechanism and the second tool driving mechanism are movable in an axial direction of the first workpiece holding mechanism and the second workpiece holding mechanism, the first tool driving mechanism and the second tool driving mechanism are coupled by relatively moving in the axial direction,
wherein the first tool driving mechanism machines the first workpiece independently from the second tool driving mechanism when a rotational driving force necessary for machining the first workpiece is smaller than a possessed rotational driving force produced from the first driving source of the first tool driving mechanism, and
the first tool driving mechanism and the second tool driving mechanism are coupled by the coupling mechanism to jointly drive the first tool when the rotational driving force necessary for machining the first workpiece is larger than the possessed rotational driving force produced from the first driving source of the first tool driving mechanism, so that the rotational driving force produced from the second driving source of the second tool driving mechanism is transmitted and added to the rotational driving force produced from the first driving source of the first tool driving mechanism.

3. The machine tool according to claim 2, further comprising: a third tool driving mechanism,
wherein the third tool driving mechanism is coupled with the first tool driving mechanism and the second tool driving mechanism when the rotational driving force necessary for machining the first workpiece is larger than the possessed rotational driving forces produced from the first driving source of the first tool driving mechanism and the second driving source of the second tool driving mechanism.

* * * * *